(12) United States Patent  
Takato

(10) Patent No.: US 7,499,226 B2  
(45) Date of Patent: Mar. 3, 2009

(54) MAGNIFYING OPTICAL SYSTEM FOR ENDOSCOPE

(75) Inventor: Hideyasu Takato, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 22 days.

(21) Appl. No.: 11/710,662

(22) Filed: Feb. 23, 2007

(65) Prior Publication Data

US 2007/0206293 A1  Sep. 6, 2007

(30) Foreign Application Priority Data

Mar. 1, 2006 (JP) ............................. 2006-054498

(51) Int. Cl.
*G02B 15/14* (2006.01)
*A61B 1/06* (2006.01)
(52) U.S. Cl. .................. 359/690; 600/168; 600/167
(58) Field of Classification Search ................. 359/661, 359/676, 689, 690, 693; 600/167, 168
See application file for complete search history.

(56) References Cited

U.S. PATENT DOCUMENTS

| 6,582,362 B2 * | 6/2003 | Konno | 600/167 |
| 6,943,959 B2 * | 9/2005 | Homma | 359/682 |
| 2007/0258150 A1 * | 11/2007 | Takato | 359/686 |

FOREIGN PATENT DOCUMENTS

| JP | 61-44283 | 3/1986 |
| JP | 06-317744 | 11/1994 |
| JP | 11-316339 | 11/1999 |
| JP | 2000-267002 | 9/2000 |

* cited by examiner

*Primary Examiner*—David N Spector
(74) *Attorney, Agent, or Firm*—Kenyon & Kenyon LLP

(57) ABSTRACT

A magnifying optical system for endoscope which can be set at least in a usual observing condition (at a wide position) and a condition for observing a magnified image of an object at a short distance (at a tele position) by moving any of one of lens units, and is configured so as to satisfy a condition mentioned below, thereby providing a sufficient observation depth in each observing condition:

$$f(W)/F(T) > 0.93. \tag{1}$$

20 Claims, 10 Drawing Sheets

MAGNIFYING OPTICAL SYSTEM FOR ENDOSCOPE

BACKGROUND OF THE INVENTION

1. Field of the Invention

The present invention relates to a magnifying optical system for endoscope, and more specifically an objective lens system (optical system) for endoscope which has a vari-focal function, thereby permitting observation of a magnified image.

2. Description of the Prior Art

In recent years, an increasing demand is posed in a medical field for an optical system which permits observation of a magnified image for precise diagnosis of a location which has changed to a morbid state.

Optical systems which are disclosed by official patent publications mentioned below are known as conventional examples of optical system which permits observation of such a magnified image, and is of a type which consists of three positive, negative and positive lens units, and performs a magnification change and focusing by moving the second negative lens unit:

Japanese Patent Kokoku Publication No. Sho-61-44283
Japanese Patent Kokai Application No. Hei 6-317744
Japanese Patent Kokai Application No. Hei 11-316339

Furthermore, a conventional example which is disclosed by the following official patent publication is known as an optical system which is composed of three negative, positive and negative lens units, and configured to perform a magnification change and focusing by moving the second positive lens unit:

Japanese Patent Kokai Publication No. 2000-267002

In order to enhance diagnostic precision, on the other hand, demands are posed for endoscopes which form image of higher qualities and it has been started to adopt image pickup devices on which picture elements are arranged in a number larger than conventional. It is therefore necessary to configure an image pickup optical system so as to have high performance which copes with such image pickup devices on which the picture element are arranged at large numbers.

In case of observation with an endoscope, for example, it is demanded to obtain an image having an image quality which is not lowered from a far point to a near point in an observation depth of an image pickup optical system, and it is therefore necessary for meeting this demand to use an image pickup optical system which has nearly pan-focus performance which is obtained by enlarging an large F number, or reducing an aperture of an aperture stop.

On the other hand, it is necessary to configure an image pickup optical system so as to satisfy the following Rayleigh limit condition to prevent an image quality from being lowered due to a diffraction phenomenon which is allowed to occur when an F number is enlarged, or an aperture of an aperture stop is reduced:

$Fno < 1.64 P/\lambda$ wherein a reference symbol Fno represents an F number of an image pickup optical system, a reference symbol P designates a pitch of picture elements arranged on the image pickup device and a reference symbol $\lambda$ denotes a wavelength.

It will be understood from the above-mentioned formula that so large an F number cannot be obtained as picture elements are arranged at a smaller pitch P or, or in a larger number of an image pickup device. Accordingly, arrangement of picture elements in a larger number of an image pickup device may result in an insufficient observation depth of an image pickup optical system, thereby making it impossible to obtain a desired image quality.

In a case where a magnifying endoscope is set in a condition for observing a magnified image of an object at a short distance (at a tele position) in particular, the short distance between an objective lens system and the object makes it necessary to reserve a sufficient image quality on a side of a near point of an observation depth and an aperture of an aperture stop is usually reduced to a diffraction limit.

In this case, a conventional magnifying endoscope poses no problem in practical use since the endoscope provides a sufficient observation depth even when an F number is changed by moving a lens system from a condition for observing a magnified image of an object at a short distance (tele position) to a usual observing condition (wide position).

In the optical system disclosed by Japanese Patent Kokoku Publication No. Sho 61-44283, Japanese Patent Kokai Publication No. Hei 6-317744 and Japanese Patent Kokai Publication No. Hei 11-316339 out of the above-mentioned conventional examples, movable lenses are disposed after aperture stops and exit pupils are moved from the image side to the object side for observing magnified images. For this reason, F numbers in usual observing conditions are smaller than those in conditions for observing magnified images.

When the conventional optical system disclosed by these patent publications are used in combination with image pickup device on which picture elements are arranged in large numbers, the optical systems will have too small F numbers in the usual observing conditions even if the F numbers are reduced to the diffraction limit, thereby having short depths and posing problems in practical use.

Furthermore, Japanese Patent Kokai Publication No. 2000-267002 discloses a magnifying optical system for endoscope of a type having an F number which is not different between a usual observing condition and a condition for observing a magnified image.

The magnifying optical system for endoscope disclosed by this patent consists of three negative, positive and negative lens units, and performs a magnification change and focusing by moving the second lens unit.

However, since this optical system uses only one positive lens unit, the movable second lens unit tends to have strong power.

Accordingly, this optical system allows aberrations to be changed remarkably between a usual observing condition and a condition for observing a magnified image, and cannot meet a demand for a high image quality. This optical system allows a remarkable change of chromatic aberration in particular which is a cause of image color oozing.

Furthermore, Japanese Patent Kokai Publication No. 2000-67002 discloses an optical system consisting of three positive, negative and positive lens units, out of which the second lens unit is movable. However, an optical system of this type allows an F number to be changed remarkably between a usual observing condition and a condition for observing a magnified image, thereby posing a problem which is similar to those posed by the optical systems disclosed by Japanese Patent Kokoku Publication No. Sho 61-44283, Japanese Patent Kokai Publication No. Hei 6-317744 and Japanese Patent Kokai Publication No. Hei 11-316339.

Furthermore, the above-mentioned Japanese Patent Kokoku Publication No. Sho 61-44283 discloses an objective lens system for endoscope having a high magnification, which is problematic for practical use since the optical system has a narrow visual field in a usual observing condition, thereby making it difficult to perform such works as screening interiors of living bodies for finding morbid portions, treatment of the morbid portions and the like.

SUMMARY OF THE INVENTION

An object of the present invention is to provide a magnifying optical system for endoscope comprising an objective lens system which can be set in a usual observing condition (at a wide position) and in a condition for observing a magnified image of an object at a short distance (at a tele position) by moving any one of lens units, and satisfies the following condition (1):

$$F(W)/F(T)>0.93 \tag{1}$$

Another object of the present invention is to provide a magnifying optical system for endoscope which comprises an objective lens system composed, in order from the object side, of a first positive lens unit, a second negative lens unit and a third positive lens unit, performs focusing and a magnification change by moving the second negative lens unit together with an aperture stop along an optical axis, and satisfies the following condition (2):

$$0.4<|f3/f2|<1.38 \tag{2}$$

The magnifying optical systems for endoscope according to the present invention which have the above described compositions allow F numbers to be changed little between usual observing conditions and conditions for observing magnified images, are capable of reserving sufficient observation depths in any observing condition and provide images of high qualities.

DETAILED DESCRIPTION OF THE PREFERRED EMBODIMENTS

Figure 1:
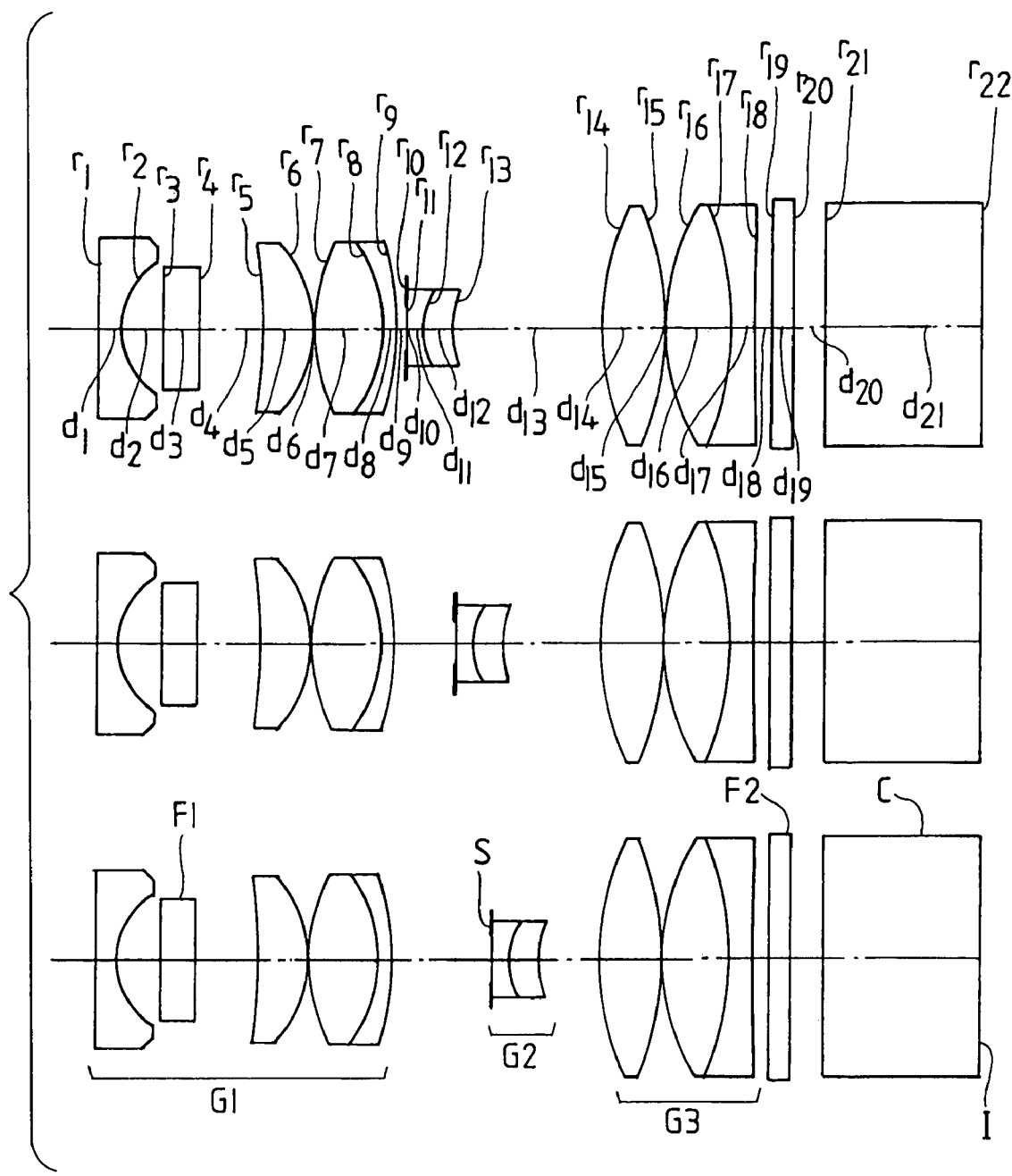
FIG. 1 is a sectional view illustrating a composition of a first embodiment of the present invention.

The magnifying optical system for endoscope according to the present invention which has a first composition is characterized by comprising an objective lens system which can be set at least in a usual observing condition (at a wide position) and a condition for observing a magnified image of an object at a short distance (at a tele position) by moving a certain lens unit, and satisfying the following condition (1);

$$F(W)/F(T)>0.93 \tag{1}$$

wherein reference symbols F(W) and F(T) represent F numbers of the optical system in the usual observing condition (at the wide position) and in the condition for observing the magnified image of the object at the short distance (at the tele position) respectively.

Furthermore, the magnifying optical system for endoscope according to the present invention which has a second composition is characterized by comprising an objective lens system consisting, in order from the object side, of a first positive lens unit, a second negative lens unit and a third positive lens unit, performing focusing and a magnification change by moving the second negative lens unit together with an aperture stop along an optical axis, and satisfying the following condition (2):

$$0.4<|f3/f2|1.38 \tag{2}$$

wherein reference symbols f2 and f3 represent focal lengths of the second and third lens units respectively.

Furthermore, it is desirable that the magnifying optical system for endoscope according to the present invention which as the second composition additionally satisfies the following condition (3)

$$1.5<|f2/f1|<3.5 \tag{3}$$

wherein reference symbols f1 and f2 represent focal lengths of the first and second lens units respectively.

Furthermore, it is more preferable that the optical system which has the second composition satisfies the following condition (1):

$$F(W)/F(T)>0.93 \tag{1}$$

wherein reference symbols F(W) and F(T) represent F numbers of the optical system in a usual observing condition (at a wide position) and in a condition for observing a magnified image of an object at a short distance (at a tele position) respectively.

The magnifying optical system for endoscope according to the present invention which has the above described composition (first or second composition) is capable of providing a sufficient observation depth in each vari-focal condition of the optical system (objective lens system), thereby permitting observing an image of a little degraded quality when the optical system is combined with an image pickup device on which picture elements are arranged at a high density.

The condition (1) is required for reserving a sufficient observation depth in each vari-focal condition ranging from the usual observing condition (wide position) to the condition for observing the magnified image of the object at the short distance (tele position), or reserving a required observation depth in the usual observing condition (at the wide position) in particular.

An optical system for endoscope permits observing living bodies and the like more minutely as picture elements are arranged in larger number on an image pickup device such as a CCD, a CMOS sensor or the like to be used in combination with the optical system. When a magnified image is observed through an optical system which is combined with such an image pickup device, however, a quality of the image is apt to be lowered due to a diffraction phenomenon even at a relatively small F number. A magnifying optical system (objective lens system) for endoscope which is set in a condition for observing a magnified image in particular has an F number which is larger, in most cases, than an F number of the optical system which is set in a usual observing condition. When a magnifying optical system for endoscope has a small F number in a condition for observing a magnified image of an object at a short distance (at a tele position), an F number will be smaller than required, thereby making it impossible to obtain a required observation depth in a usual observing condition (at a wide position).

So far as an optical system satisfies the condition (1), an F number in a usual observing condition (at a wide position) is nearly equal to an F number in a condition for observing a magnified image of an object at a short distance (at a tele position), the F number in the usual observing condition (at the wide position) cannot be smaller than required even when a small F number is selected for preventing an influence due to diffraction in the condition for observing the magnified image of the object at the short distance (at the tele position). So far as an optical system satisfies the condition (1), the optical system is capable of reserving a sufficient observation depth in each vari-focal condition from the usual observing condition (the wide position) to the condition for observing the magnified image of the object at the short distance (the tele position) even when the optical system is combined with an image pickup device on which picture elements are arranged in a larger number.

If F(W)/F(T) has a value smaller than 0.93, in contrast, an F number in a usual observing condition (at a wide position) will unpreferably be smaller than required when an F number is reduced to the diffraction limit in a condition for observing a magnified image of an object located at a short distance.

Furthermore, in order to prevent the influence due to diffraction in the condition for observing the magnified image of the object located at the short distance (tele position) of the optical system according to the present invention which has the first composition, it is desirable to additionally satisfy the following condition (4):

$$F(T)<9.5 \qquad (4)$$

wherein a reference symbol F(T) represents an F number of the optical system in the condition for observing the magnified image of the object at the short distance (at the tele position).

In case of an assumption that an optical system is used in combination with a CCD or a CMOS on which picture elements are arranged in a larger number, a value of F(T) which exceeds a range defined by the condition (4), or is larger than 9.5, is unpreferable since such a value of F(T) allows the influence due to diffraction to start to be noticeable, thereby making it impossible to obtain an image highly precise enough for the CCD on which the picture elements are arranged at the large number.

By configuring an optical system so as to satisfy the conditions (1) and (4), it is possible to obtain an optical system which permits enlarging an F number (reducing an aperture of an aperture stop) to the diffraction limit in any condition within a range from a usual observing condition to a condition for observing a magnified image of an object at a short distance. Accordingly, it is possible to realize an optical system which permits enlarging an F number (reducing an aperture of an aperture stop) to the diffraction limit in any condition within a range from a usual observing condition (a wide position) to a condition for observing a magnified image of an object at a short distance (a tele position). It is therefore possible to obtain a sufficient observation depth in each vari-focal within the range from the usual observing condition (wide position) to the condition for observing the magnified image of the object at the short distance (tele position).

For an image pickup device on which picture elements are arranged in a large number and which is to be used in combination with the optical system according to the present invention, it is preferable to satisfy the following condition (11):

$$0.4<IH/(p\times1000)<0.7 \qquad (11)$$

wherein a reference symbol IH represents a maximum image height on an image pickup surface of the image pickup device and a reference symbol p designates a pitch of the picture elements.

If a lower limit of the condition (11) is exceeded, or if $IH/(p\times1000)$ has a value not larger than 0.4, picture elements will be arranged at a large pitch on an image pickup device, or the image pickup device cannot be referred to as an image pickup device on which picture elements are arranged in a large number. If an upper limit of the condition (11) is exceeded, or if $IH/(p\times1000)$ has a value larger than 0.7, in contrast, picture elements will be arranged at a small pitch or a in a large number, but an image will easily be influenced by diffraction and a sufficient observation depth cannot be obtained in each vari-focal condition of an objective optical system.

Now, description will be made of the magnifying optical system for endoscope according to the present invention which has the second composition.

The optical system which has the second composition consists of the three positive, negative and positive lens units, and performs the magnification change and focusing by moving the second negative lens unit along the optical axis. The second movable lens unit can be have a short outside diameter when this lens unit is configured as a lens unit having negative refractive power and an aperture stop is disposed in the vicinity of this lens unit. This configuration of the second lens unit and the disposition of the aperture stop make it possible to dispose a mechanism for moving the movable lens unit in a direction of the optical axis (for example, an actuator or the like which is connected to a lens barrel sustaining the movable lens unit for giving a driving force this lens barrel) around the movable lens unit. Furthermore, the configuration and disposition makes it possible to reduce a weight of the movable lens unit, thereby reducing a load to be imposed on the mechanism for moving the movable lens unit.

Furthermore, it is desirable that the aperture stop which is disposed before or after the above described lens unit having the negative refractive power is moved together with the lens having the negative refractive power. In this case, the aperture stop is moved from the object side to the image side as a condition is changed from the usual observing condition (wide position) to the condition for observing the magnified image of the object at the short distance (tele position).

Assuming a condition where the stop is kept stationary, the second lens unit having the negative refractive power will be far from an exit pupil in the condition for observing the magnified image of the object at the short distance, whereby rays of a marginal light bundle will be high on the third lens unit having the positive refractive power and this third lens unit will unpreferably have a large diameter.

By configuring an optical system which consists of three positive, negative and position lens units like the second composition according the present invention so as to move the second negative lens unit together with an aperture stop, it is possible to realize a compact magnifying optical system for endoscope without enlarging an outside diameter of the third positive lens unit.

Furthermore, the configuration to move the second lens unit together with aperture stop makes it possible to restrain an F number from changing between the usual observing condition (wide position) and the condition for observing the magnified image of the object at the short distance (tele position), and makes it easy to reserve a required observation depth by reducing an F number to the diffraction limit in each observing condition.

Furthermore, the optical system according to the present invention which has the second composition is characterized as described above by satisfying the following condition (2):

$$0.4 < |f3/f2| < 1.38 \quad (2)$$

wherein reference symbols f2 and f3 represent focal lengths of the second lens unit and the third lens unit respectively.

If |f3/f2| has a value smaller than a lower limit of 0.4 of the condition (2), the second lens unit will have a long focal length and must be moved for a long distance to change a condition from the usual observing condition (wide position) to the condition for observing the magnified image of the object at the short distance (tele position). Too long a moving distance of the second lens unit is unpreferable since such a long distance will prolong a total length of the optical system as a whole. When an actuator is to be used as means for moving the lens unit, such a long distance will prolong a stroke for driving the lens unit, thereby unpreferably enlarging a driving mechanism including the actuator.

If |f3/f2| has a value larger than an upper limit of 1.38 of the condition (2), in contrast, the third lens unit will have a long focal length, thereby prolonging a back focus of the optical system. As s result, an image pickup optical system including an image pickup device will unpreferably have a large total length and a large size. In case of an endoscope, a large total length of an image pickup optical system will prolong a distal end (portion which is not curved) at a tip of the endoscope, thereby unpreferably increase a burden on a patient at a time of inserting of the endoscope into a body of the patient.

Furthermore, it is more preferable to satisfy, in place of the condition (2), the following condition (2-1):

$$0.6 < |f3/f2| < 1.2 \quad (2-1)$$

Furthermore, it is more desirable that the optical system according to the present invention which has the second composition satisfies the following condition (3):

$$1.5 < |f2/f1| < 3.5 \quad (3)$$

wherein reference symbols f1 and f2 represent focal lengths of the first lens unit and the second lens unit respectively.

If |f2/f1| has a value smaller than a lower limit of 1.5 of the condition (3), the second lens unit will have a short focal length relative to that of the first lens unit, whereby chromatic aberration will be varied remarkably by moving the second lens unit. Lateral chromatic aberration in particular will be produced in a large amount, thereby unpreferably causing image color oozing.

If |f2/f1| has a value larger than an upper limit of 3.5 of the condition (3), the first lens unit will have a short focal length, thereby producing spherical aberration in a large amount. When aberrations are produced in large amounts in the condition for observing the magnified image of the object at the short distance (at the tele position) in which an observing magnification is high in particular, such a short focal length of the first lens unit not only makes it impossible to obtain a desired resolution for minute observation of a magnified image of an object but also unpreferably constitutes causes of noises such as coma flare which lower an image quality.

Furthermore, it is desirable that the optical system according to the present invention which has the second composition additionally satisfies the following condition (7):

$$1.5 < f3/f1 < 2.5 \quad (7)$$

wherein reference symbols f1 and f3 represent focal lengths of the first lens unit and the third lens unit respectively.

If f3/f2 has a value smaller than a lower limit of 1.5 of the condition (7), the first lens unit will have a long focal length, the first lens unit will unpreferably have a long focal length, whereby spherical aberration will be undercorrected as in a case of the condition (3) and further coma cannot be corrected.

If f3/f1 has a value larger than an upper limit of 2.5 of the condition (7), the third lens unit which contributes to correction of a Petzval's sum will have too short a focal length and a Petzval's sum will be large, whereby an image surface will be tilted and can hardly be corrected. Accordingly, it will unpreferably impossible to reserve favorable resolution within a range from a center to a margin of an image.

For the optical system according to the present invention (which has the first or second composition), it is desirable that a maximum height of a ray on an image side surface of a final lens (a most image side surface of the optical system) satisfies the following condition (8):

$$0.5 < hT/hW < 1.2 \quad (8)$$

wherein reference symbols hT represents a maximum height of a ray on a final surface of the optical system in the condition for observing the magnified image of the object at the short distance (at the tele position) and a reference symbol hW designates a maximum height of the ray on the final surface of the optical system in the usual observing condition (at the wide position).

If hT/hW has a values exceeding a range defined by the condition (8), an angle of incidence on an image pickup device will not be within a predetermined range, thereby reducing a light amount at marginal portions of an image. If hT/hW has a value smaller than a lower limit of 0.5 of the condition (8) in particular, rays will unpreferably be attenuated remarkably at the marginal portions of the image in the condition for observing the magnified image of the object at the short distance. If hT/hW has a value larger than an upper limit of 1.2 of the condition (8), in contrast, a height of a ray will be high on the third lens unit, thereby unpreferably enlarging an outside diameter of the third lens unit. Furthermore, it is preferable for shortening outside diameters of lenses to delimit an upper limit not by the condition (8) but by the following condition (8-1):

$$0.5 < hT/hW < 0.85 \qquad (8\text{-}1)$$

Furthermore, for configuring the first lens unit compact, it is desirable to configure the optical system according to the present invention so as satisfy the following condition (9):

$$0.5 < Enp/flw < 1.5 \qquad (9)$$

wherein a reference symbol Enp represents a distance as measured from a most object side surface of the optical system to an entrance pupil in the usual observing condition (at the wide position) (hereinafter referred simply as a location of the entrance pupil) and a reference symbol flw designates a focal length of the optical system as a whole in the usual observing condition (at the wide position).

If Enp/flw has a value smaller than a lower limit of 0.5 of the condition (9), the optical system as a whole will have a large focal length relative to the location of the entrance pupil and distortion will be produced too remarkably when an attempt is made to reserve a field angle required at a at time of usual observation through an endoscope (at least not smaller than 100°, preferably not smaller than 120°). As a result, a difference will unpreferably be too large between a magnification at a center and a magnification at a marginal portion of an image. If Enp/flw has a value larger than an upper limit of 1.5 of the condition (9), in contrast, the first lens unit will have a large outside diameter, thereby enlarging an image pickup optical system.

Furthermore, for configuring an image pickup optical system compacter, it is preferable to modify the upper limit of the condition (9) to 1.0, or satisfy, in place of the condition (9), the following condition (9-1):

$$0.5 < Enp/flw < 1.0 \qquad (9\text{-}1)$$

Furthermore, it is preferable that an observing magnification $\beta(T)$ in the condition for observing the magnified image of the object at the short distance (at the tele position) of the magnifying optical system according to the present invention satisfies the following condition (5):

$$\beta(T) < -0.6 \qquad (5)$$

For precise diagnosis of a morbid portion in a living body under observation through an endoscope, it is desirable that an observing magnification in the condition for observing the magnified image of the object at the short distance satisfies the condition (5). In other words, a magnifying optical system for endoscope which has an observing magnification satisfying the condition (5) makes it possible to find a minute morbid portion produced in a tissue of a living body without fail and is useful in particular for finding a cancer at an early stage and the like.

If $\beta(T)$ has a value larger than $-0.6$ defined by the condition (5), it will unpreferably be hard to observe a magnified image of a minuter morbid portion.

Furthermore, in case of an optical system which is to be used, for example, to precisely inspect a minuter morbid portion for a diagnosis to judge a possibility of canceration of a tissue of a living body under attention, it is desirable to satisfy, in place of the condition (5), the following condition (5-1):

$$\beta(T) < -1.5 \qquad (5\text{-}1)$$

When combined with an image pickup device on which picture elements are arranged in large number, a magnifying optical system for endoscope which satisfies the condition (5-1) provides resolution of several microns to several tens of microns. Assuming an observation of an image displayed on a 14-inch monitor, this optical system provides a magnification on the order of 200× to 500×, thereby permitting an observation at a cell level. This optical system makes it possible to observe a phenomenon which appears specifically at a canceration time of a normal cell such as disturbance of cell arrangement, abnormal obesity of a cell nucleus, abnormal hyperplasia of a capillary around a cell nucleus or the like.

Furthermore, it is required for such a magnifying optical system for endoscope which permits a magnified image observation to perform works such as screening of an interior of a living body for finding a morbid portion, treatment of the morbid portion and the like while reserving a wide visual field in the usual observing condition.

For meeting this requirement, it is desirable that the optical system not only reserves a high magnification in the condition for observing the magnified image but also satisfy, in the usual observing condition, the following condition (6):

$$\omega > 60° \qquad (6)$$

wherein a reference symbol ω represents half a field angel of the optical system in the usual observing condition (at the wide position).

So far as half a field angle is within a range defined by the condition (6), the optical system is capable of reserving a range of visual field for diagnosis on the order of that of an endoscope which has no magnifying function, thereby allowing a usual diagnosis to be carried out with no problem.

Furthermore, it is desirable for the magnifying optical system for endoscope according to the present invention to keep a constant diameter of the aperture stop while the aperture stop is moved along the optical axis, it is unpreferable to mount a variable stop mechanism, since an actuator is disposed in the optical system for driving the lens unit and the variable stop mechanism thickens a lens barrel for accommodating an image pickup optical system.

The magnifying optical system for endoscope according to the present invention provides an effect that the optical system makes it possible to observe a magnified highly precise image using an image pickup device on which picture elements are arranged in a large number.

Now, description will be made of the preferred embodiments of the magnifying optical system for endoscope according to the present invention.

A first embodiment of the magnifying optical system for endoscope according to the present invention is an optical system which has a composition illustrated in FIG. 1 and the following numerical data:

| (object surface) | | | |
|---|---|---|---|
| | $d_0 = D0$ | | |
| $r_1 = \infty$ | $d_1 = 0.36$ | $n_1 = 1.88300$ | $\nu_1 = 40.78$ |
| $r_2 = 1.297$ | $d_2 = 0.73$ | | |
| $r_3 = \infty$ | $d_3 = 0.62$ | $n_2 = 1.51400$ | $\nu_2 = 75.00$ |
| $r_4 = \infty$ | $d_4 = 1.13$ | | |
| $r_5 = -8.3111$ | $d_5 = 0.88$ | $n_3 = 1.48749$ | $\nu_3 = 70.23$ |
| $r_6 = -1.980$ | $d_6 = 0.01$ | | |
| $r_7 = 3.240$ | $d_7 = 1.20$ | $n_4 = 1.51633$ | $\nu_4 = 64.14$ |
| $r_8 = -2.332$ | $d_8 = 0.24$ | $n_5 = 2.00330$ | $\nu_5 = 28.27$ |
| $r_9 = -4.319$ | $d_9 = D1$ | | |
| $r_{10} = \infty$ (stop) | $d_{10} = 0.02$ | | |
| $r_{11} = \infty$ | $d_{11} = 0.28$ | $n_6 = 1.48749$ | $\nu_6 = 70.23$ |
| $r_{12} = 1.257$ | $d_{12} = 0.52$ | $n_7 = 1.59270$ | $\nu_7 = 35.31$ |
| $r_{13} = 1.927$ | $d_{13} = D2$ | | |

-continued (object surface)

| | | | |
|---|---|---|---|
| $r_{14} = 4.593$ | $d_{14} = 1.08$ | $n_8 = 1.48749$ | $\nu_8 = 70.23$ |
| $r_{15} = -5.372$ | $d_{15} = 0.02$ | | |
| $r_{16} = 3.767$ | $d_{16} = 1.19$ | $n_9 = 1.51633$ | $\nu_9 = 64.14$ |
| $r_{17} = -4.774$ | $d_{17} = 0.42$ | $n_{10} = 1.92286$ | $\nu_{10} = 18.90$ |
| $r_{18} = 52.579$ | $d_{18} = 0.29$ | | |
| $r_{19} = \infty$ | $d_{19} = 0.40$ | $n_{11} = 1.52287$ | $\nu_{11} = 59.89$ |
| $r_{20} = \infty$ | $d_{20} = 0.56$ | | |
| $r_{21} = \infty$ | $d_{21} = 2.75$ | $n_{12} = 1.51633$ | $\nu_{12} = 64.14$ |
| $r_{22} = \infty$ | | | |

| | Usual observing condition (wide position) | Intermediate condition | Condition for observing magnified image of object at short distance (tele position) |
|---|---|---|---|
| D0 | 16.00 | 3.38 | 2.00 |
| D1 | 0.16 | 1.06 | 1.72 |
| D2 | 2.56 | 1.66 | 1.00 |
| fIw | 1.758 | 1.959 | 2.024 |
| Fno | 7.0 | 7.2 | 7.3 |

$fW/fT = 0.96$
$|f3/f2| = 0.87$
$|f2/f1| = 2.18$
$fT = 7.3$
$\beta T = -0.71$
$\omega = 66.5°$
$f3/f1 = 1.9$
$hT/hW = 0.66$
$Enp/fIw = 0.73$
$IH/(p \times 1000) = 0.6$ wherein reference symbols $r_1, \ldots$ represent radii of curvature on surfaces of respective lens elements, reference symbols $d_1, \ldots$ designate thicknesses of the respective lens elements and airspaces reserved between the lens surfaces, reference symbols $n_1, n_2, \ldots$ denote refractive indices of the respective lens elements for the e-line, and reference symbols $\nu_1, \nu_2, \ldots$ represent Abbe's numbers of the respective lens elements for the d-line. Furthermore, a reference symbol $d_0$ designates a distance as measured from an object surface to a first surface ($r_1$) of the optical system. In addition, lengths such as r and d are specified in a unit of millimeter.

As illustrated in FIG. 1 and the above described numerical data, the optical system according to the first embodiment consists, in order from the object side, of a first lens unit G1 ($r_1$ to $r_9$) having positive refractive power, a second lens unit G2 ($r_{11}$ to $r_{13}$) having negative refractive power and a third lens unit G3 ($r_{14}$ to $r_{18}$) having positive refractive power. Furthermore, an aperture stop S($r_{10}$) is disposed on the object side of the second lens unit G2.

The first embodiment performs a magnification change and focusing from a usual observing condition (wide position) to a condition for observing a magnified image of an object at a short distance (tele position) by moving on the image side the second lens unit G2 together with the aperture stop S along an optical axis.

Speaking concretely, the first embodiment performs the magnification change and the focusing by moving the second lens unit G2 along the optical axis as illustrated at an upper stage (the usual observing condition), a middle stage (an intermediate condition) and a lower stage (the condition for observing the magnified image of the object at the short distance).

In the first embodiment illustrated in FIG. 1, the first lens unit G1 consists of a plano-concave lens element ($r_1$ to $r_2$), a plane parallel plate F1 ($r_3$ to $r_4$), a positive meniscus lens element having a convex surface on the image side ($r_5$ to $r_6$), and a positive cemented lens component ($r_7$ to $r_9$) consisting of a biconvex lens element ($r_7$ to $r_8$) and a negative meniscus lens element ($r_8$ to $r_9$), the second lens unit G2 consists of a cemented lens component ($r_{11}$ to $r_{13}$) consisting of a plano-concave lens element ($r_{11}$ to $r_{12}$) and a positive meniscus lens element ($r_{12}$ to $r_{13}$), and the third lens unit G3 consists of a biconvex lens element ($r_{14}$ to $r_{15}$), and a cemented lens component ($r_{16}$ to $r_{18}$) consisting of a biconvex lens element ($r_{16}$ to $r_{17}$) and a biconcave lens element ($r_{17}$ to $r_{18}$). Furthermore, a cover glass plate C ($r_{21}$ to $r_{22}$) is bonded to an image pickup surface I of an image pickup device for protecting the image pickup surface. In addition, a plane parallel plate F2 ($r_{19}$ to $r_{20}$) is disposed between the third lens unit G3 and the cover glass plate C.

The plane parallel plates F1 and F2 are filters for cutting off rays having specific wavelengths respectively, for example, a ray having a wavelength of 1060 nm from a YAG laser and a ray having a wavelength of 810 nm from a semiconductor laser or rays in the near infrared region.

As described in the numerical data, the first embodiment satisfies all of the conditions (1) to (9) and the condition (11). The first embodiment also satisfies the conditions (2-1), (8-1) and (9-1). Accordingly, the first embodiment allows an F number to be changed little even when the optical system changes a magnification from the usual observing condition (wide position) to the condition for observing the magnified image of the object at the short distance (tele position) and reserves a sufficient observation depth in each magnification condition.

Furthermore, since values of focal lengths are adequately selected for the lens units so as to satisfy the condition (2), (3) and (7), the first embodiment is configured as a compact optical system which scarcely lowers an image quality.

Figure 5:
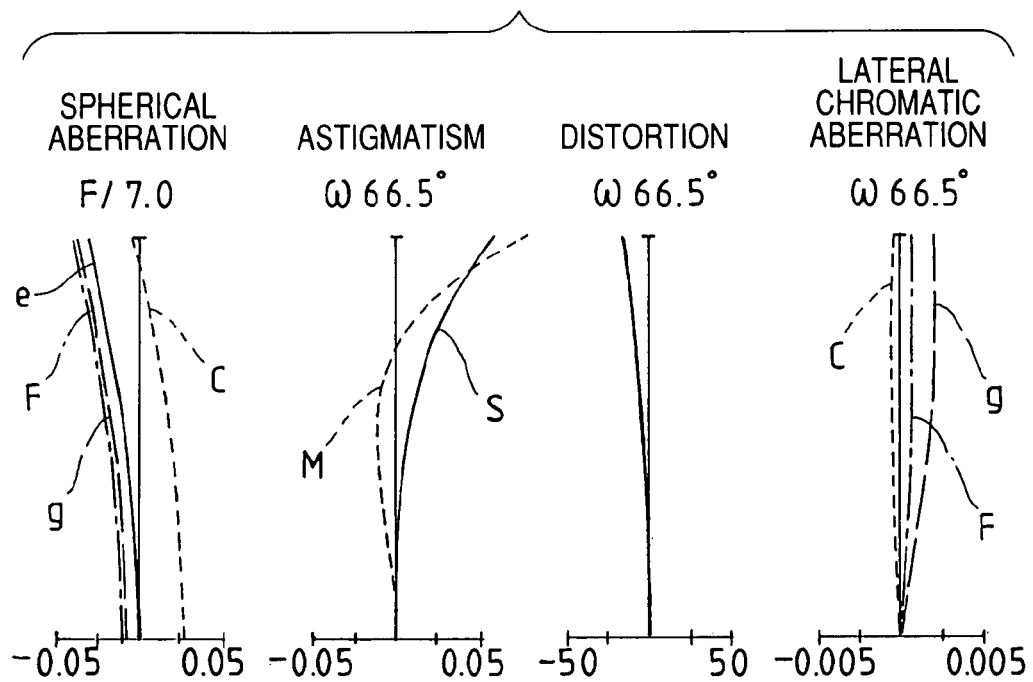
FIG. 5 shows curves illustrating aberrations in the first embodiment of the present invention set in a usual observing condition.
Figure 6:
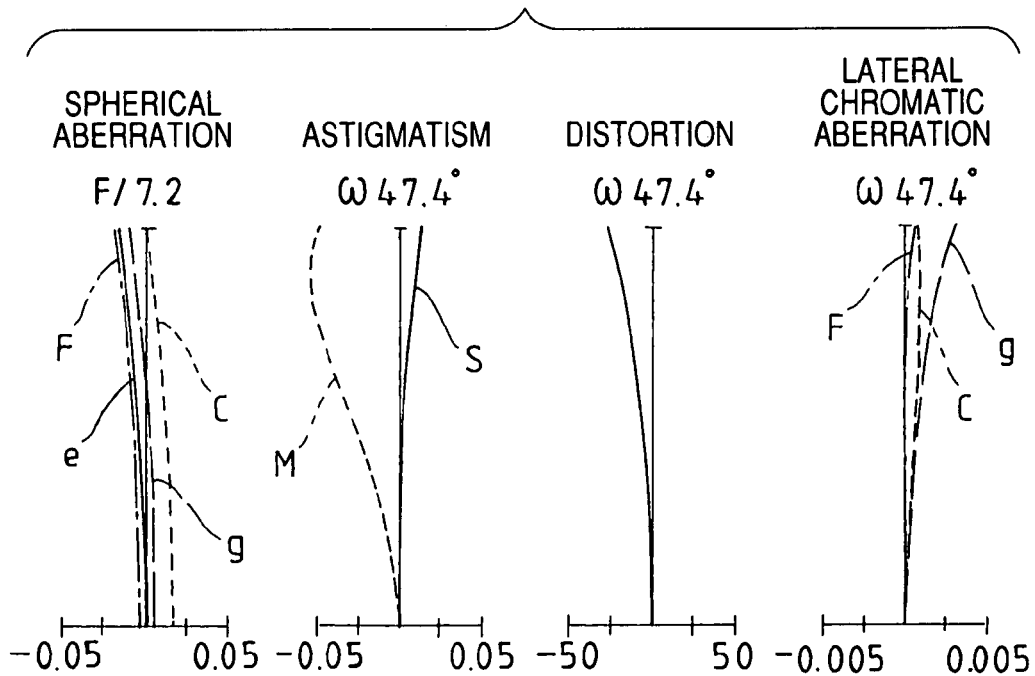
FIG. 6 shows curves illustrating aberrations in the first embodiment of the present invention set in an intermediate condition.
Figure 7:
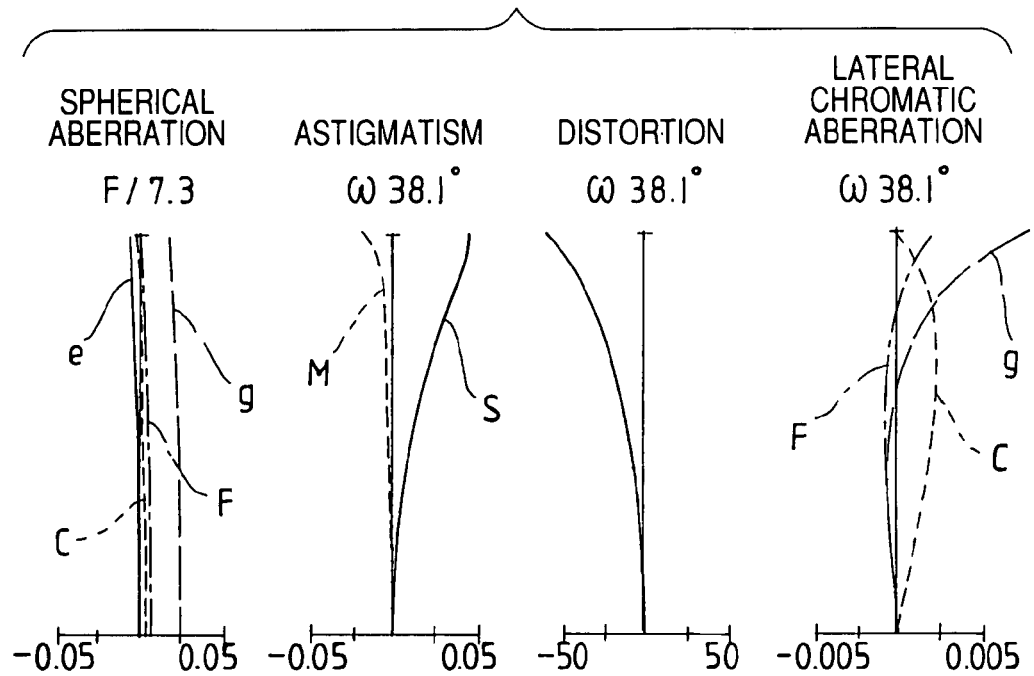
FIG. 7 shows curves illustrating aberrations in the first embodiment of the present invention set in a condition for observing a magnified image of an object at a short distance.

FIG. 5, FIG. 6 and FIG. 7 illustrate aberrations in the optical system in the usual observing condition (at the wide position), an intermediate condition and in the condition for observing the magnified image of the object at the short distance (at the tele position) respectively. As apparent from these drawings, the optical system according to the first embodiment allows an F number to be changed little and corrects aberrations favorably in any condition.

Furthermore, the first embodiment uses an image pickup device which satisfies the condition (11) and on which picture elements are arranged in a large number, thereby being capable of providing a highly precise image.

Figure 2:
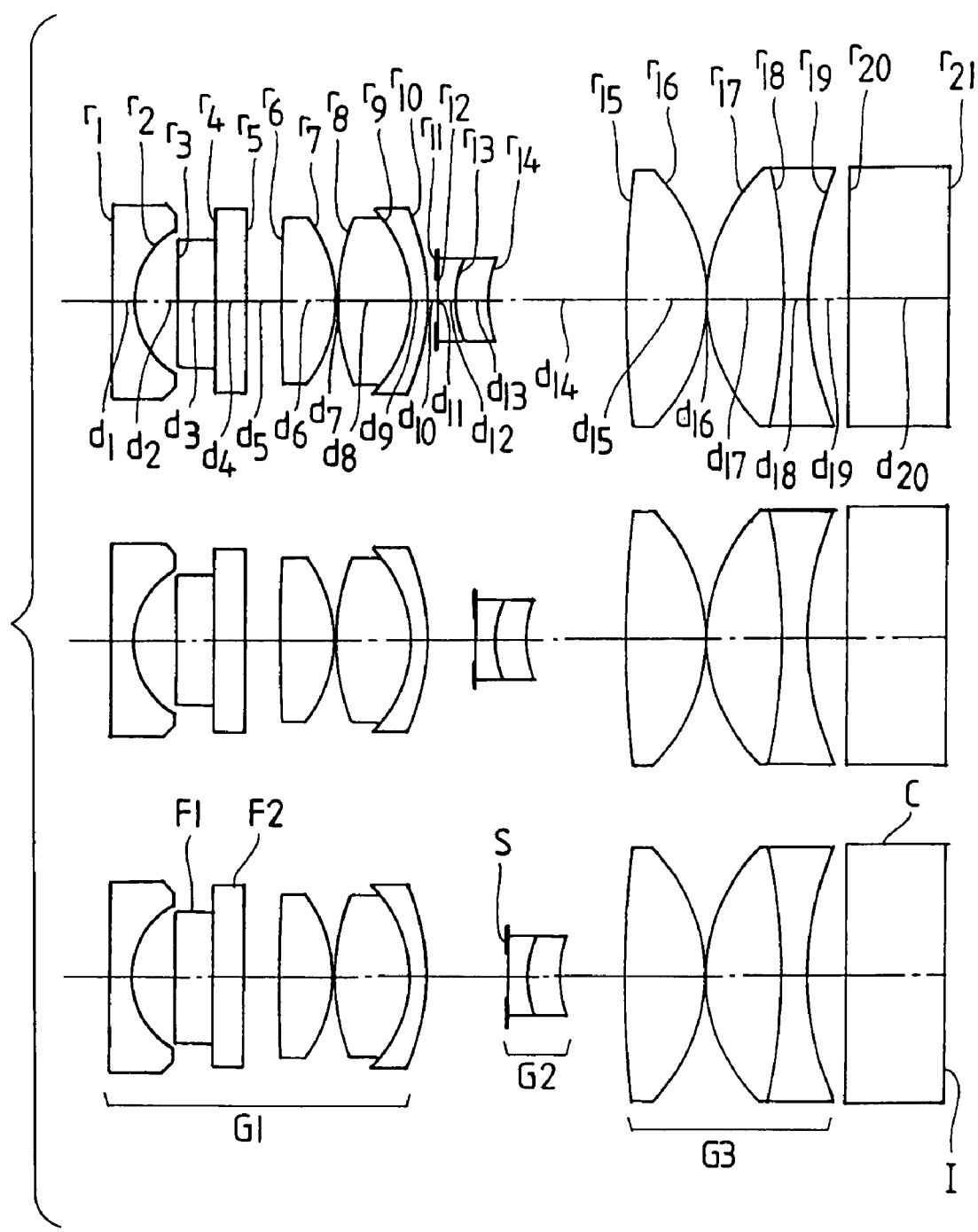
FIG. 2 is a sectional view illustrating a composition of a second embodiment of the present invention.

A second embodiment of the magnifying optical system for endoscope according to the present invention has a composition illustrated in FIG. 2 and the following numerical data:

(object surface)

| | | | |
|---|---|---|---|
| | $d_0 = D0$ | | |
| $r_1 = \infty$ | $d_1 = 0.36$ | $n_1 = 1.88300$ | $\nu_1 = 40.78$ |
| $r_2 = 1.246$ | $d_2 = 0.73$ | | |
| $r_3 = \infty$ | $d_3 = 0.62$ | $n_2 = 1.51400$ | $\nu_2 = 75.00$ |
| $r_4 = \infty$ | $d_4 = 0.50$ | $n_3 = 1.52287$ | $\nu_3 = 59.89$ |
| $r_5 = \infty$ | $d_5 = 0.57$ | | |
| $r_6 = 31.448$ | $d_6 = 0.88$ | $n_4 = 1.48749$ | $\nu_4 = 70.23$ |
| $r_7 = -2.017$ | $d_7 = 0.05$ | | |
| $r_8 = 3.576$ | $d_8 = 1.20$ | $n_5 = 1.48749$ | $\nu_5 = 70.23$ |
| $r_9 = -1.879$ | $d_9 = 0.24$ | $n_6 = 1.84666$ | $\nu_6 = 23.78$ |

-continued (object surface)

| | | | |
|---|---|---|---|
| $r_{10} = -3.339$ | $d_{10} = D1$ | | |
| $r_{11} = \infty$ (stop) | $d_{11} = 0.02$ | | |
| $r_{12} = \infty$ | $d_{12} = 0.28$ | $n_7 = 1.48749$ | $v_7 = 70.23$ |
| $r_{13} = 1.678$ | $d_{13} = 0.52$ | $n_8 = 1.84666$ | $v_8 = 23.78$ |
| $r_{14} = 1.703$ | $d_{14} = D2$ | | |
| $r_{15} = 19.018$ | $d_{15} = 1.29$ | $n_9 = 1.48749$ | $v_9 = 70.23$ |
| $r_{16} = -2.749$ | $d_{16} = 0.02$ | | |
| $r_{17} = 2.793$ | $d_{17} = 1.22$ | $n_{10} = 1.60311$ | $v_{10} = 60.64$ |
| $r_{18} = -9.649$ | $d_{18} = 0.42$ | $n_{11} = 1.92286$ | $v_{11} = 18.90$ |
| $r_{19} = 4.696$ | $d_{19} = 0.87$ | | |
| $r_{20} = \infty$ | $d_{20} = 1.60$ | $n_{12} = 1.51633$ | $v_{12} = 64.14$ |
| $r_{21} = \infty$ | | | |

| | Usual observing condition (wide position) | Intermediate condition | Condition for observing magnified image of object at short distance (tele position) |
|---|---|---|---|
| D0 | 18.00 | 3.38 | 1.80 |
| D1 | 0.16 | 0.79 | 1.34 |
| D2 | 2.25 | 1.61 | 1.07 |
| flw | 1.733 | 1.834 | 1.842 |
| Fno | 7.16 | 7.10 | 7.04 |

FW/FT = 1.02
|f3/f2| = 0.92
|f2/f1| = 2.22
FT = 7
βT = −0.71
ω = 65.5°
f3/f1 = 2.05
hT/hW = 0.79
Enp/flw = 0.73
IH/(p × 1000) = 0.56

As illustrated in FIG. 2 and the above described numerical data, the optical system according to the second embodiment consists, in order from the object side, of a first lens unit G1 ($r_1$ to $r_{10}$) having positive refractive power, a second lens unit G2 ($r_{12}$ to $r_{14}$) having negative refractive power and a third lens unit G3 ($r_{15}$ to $r_{19}$) having positive refractive power. Furthermore, an aperture stop S ($r_{11}$) is disposed on the object side of the second lens unit G2.

The second embodiment performs a magnification change and focusing from a usual observing condition (wide position) to a condition for observing a magnified image of an object at a short distance (tele position) by moving the second lens unit G2 together with the aperture stop S along an optical axis.

Speaking concretely, the second embodiment performs the magnification change and focusing by moving the aperture stop and the second lens unit G2 as illustrated in FIG. 2 which shows the usual observing condition (wide position) at an upper stage, an intermediate condition at a middle stage and the condition for observing the magnified image of the object at the short distance (tele position) at a lower stage.

In the second embodiment illustrated in FIG. 2, the first lens unit G1 consists of a plano-concave lens element ($r_1$ to $r_2$), plane parallel plates F1 and F2 ($r_3$ to $r_5$), a biconvex lens element ($r_6$ to $r_7$), and a cemented lens component ($r_8$ to $r_{10}$) consisting of a biconvex lens element ($r_8$ to $r_9$) and a negative meniscus lens element ($r_9$ to $r_{10}$), the second lens unit G2 consists of a cemented lens component ($r_{12}$ to $r_{14}$) consisting of a plano-concave lens element ($r_{12}$ to $r_{13}$) and a positive meniscus lens element ($r_{13}$ to $r_{14}$), and the third lens unit G3 consists of a biconvex lens element ($r_{15}$ to $r_{16}$), and a cemented lens component ($r_{17}$ to $r_{19}$) consisting of a biconvex lens element ($r_{17}$ to $r_{18}$) and a biconcave lens element ($r_{18}$ to $r_{19}$). Furthermore, a cover glass plate ($r_{20}$ to $r_{21}$) is bonded to an image pickup surface of an image pickup device.

In addition, the plane parallel plates F1 and F2 are filters for cutting off rays having specific wavelengths respectively, for example, a ray having a wavelength of 1060 nm from a YAG laser and a ray having a wavelength of 810 nm from a semiconductor laser or rays in the near infrared region.

The second embodiment is also an optical system which satisfies all of the conditions (1) to (9) and the condition (11) as described in the numerical data, thereby allowing an F number to be changed little in all vari-focal conditions within a range from the usual observing condition (wide position) to the condition for observing the magnified image of the object at the short distance (tele position) and providing a sufficient observation depth in each magnification condition. Furthermore, the second embodiment satisfies also the conditions (2-1), (8-1) and (9-1).

Furthermore, the second embodiment also selects adequate values for focal lengths of the first lens unit, the second lens unit and the third lens unit so as to satisfy the conditions (2), (3) and (7) also, thereby constituting a compact image pickup optical system which allows an image quality to be lowered little in each condition.

Figure 8:
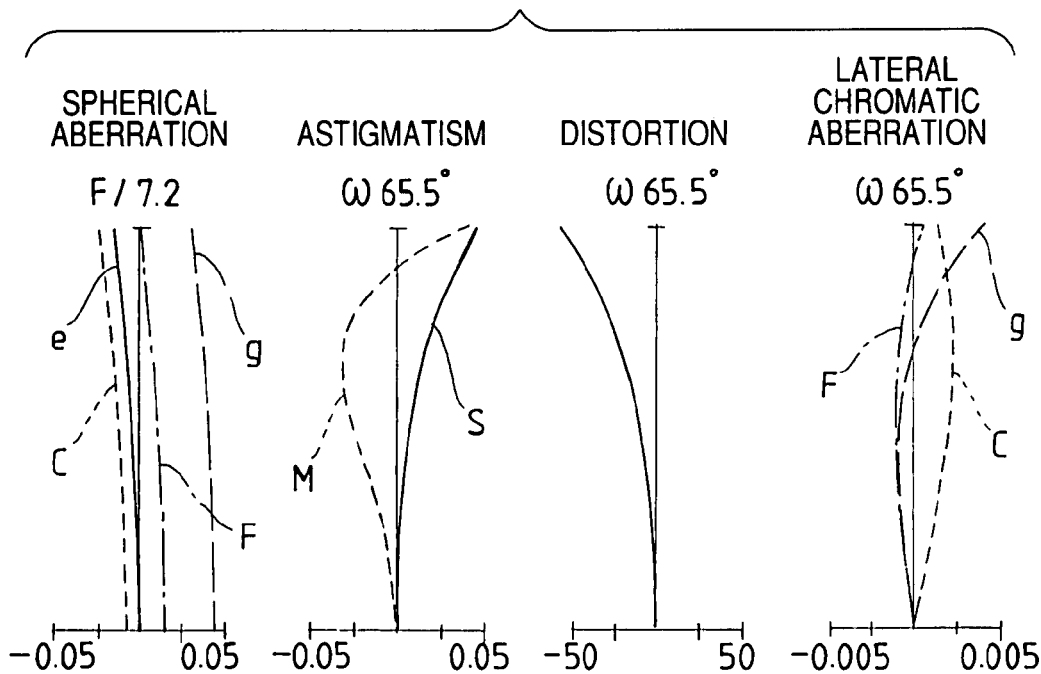
FIG. 8 shows curves illustrating aberrations in the second embodiment of the present invention set in a usual observing condition.
Figure 9:
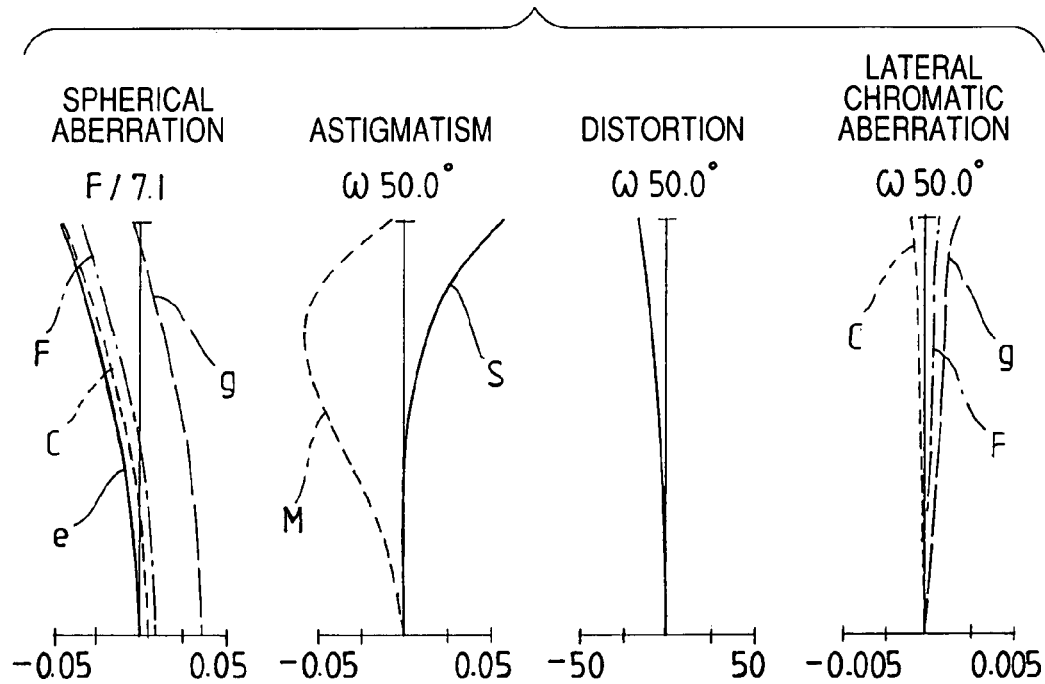
FIG. 9 shows curves illustrating aberrations in the second embodiment of the present invention set in an intermediate condition.
Figure 10:
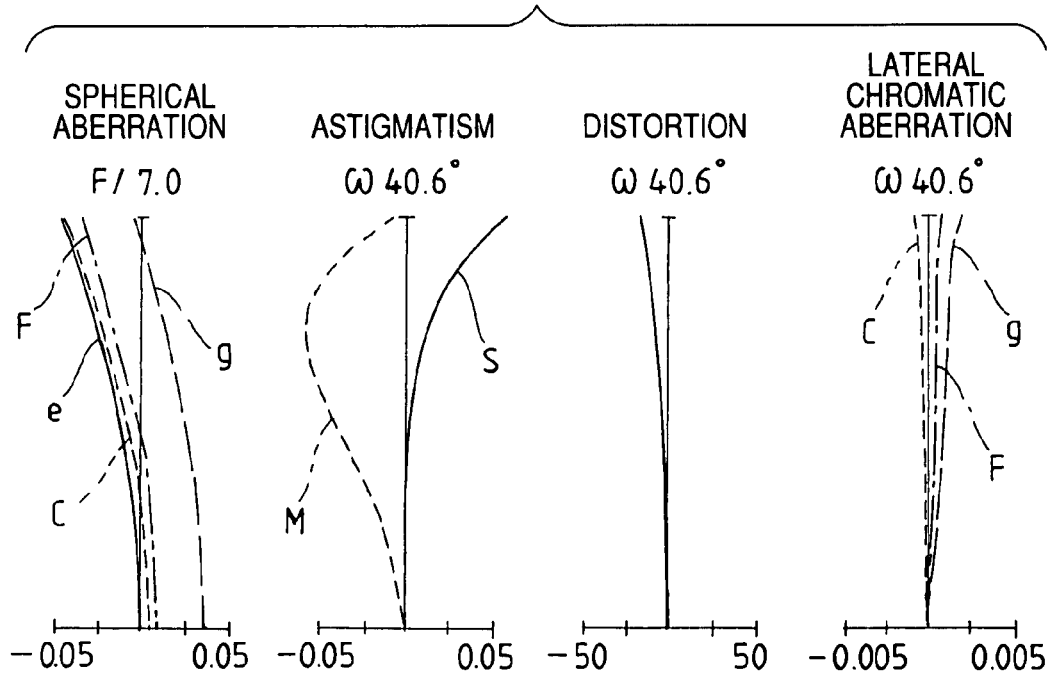
FIG. 10 shows curves illustrating aberrations in the second embodiment of the present invention set in a condition for observing a magnified image of an object at a short distance.

As illustrated in FIG. 8, FIG. 9 and FIG. 10 showing aberration curves, the second embodiment favorably corrects aberrations in the usual observing condition, an intermediate condition and the condition for observing the magnified image of the object at the short distance.

Furthermore, the second embodiment is also capable of providing a highly precise image since the second embodiment uses an image pickup device which satisfies the condition (11) and on which picture elements are arranged in a large number.

Figure 3:
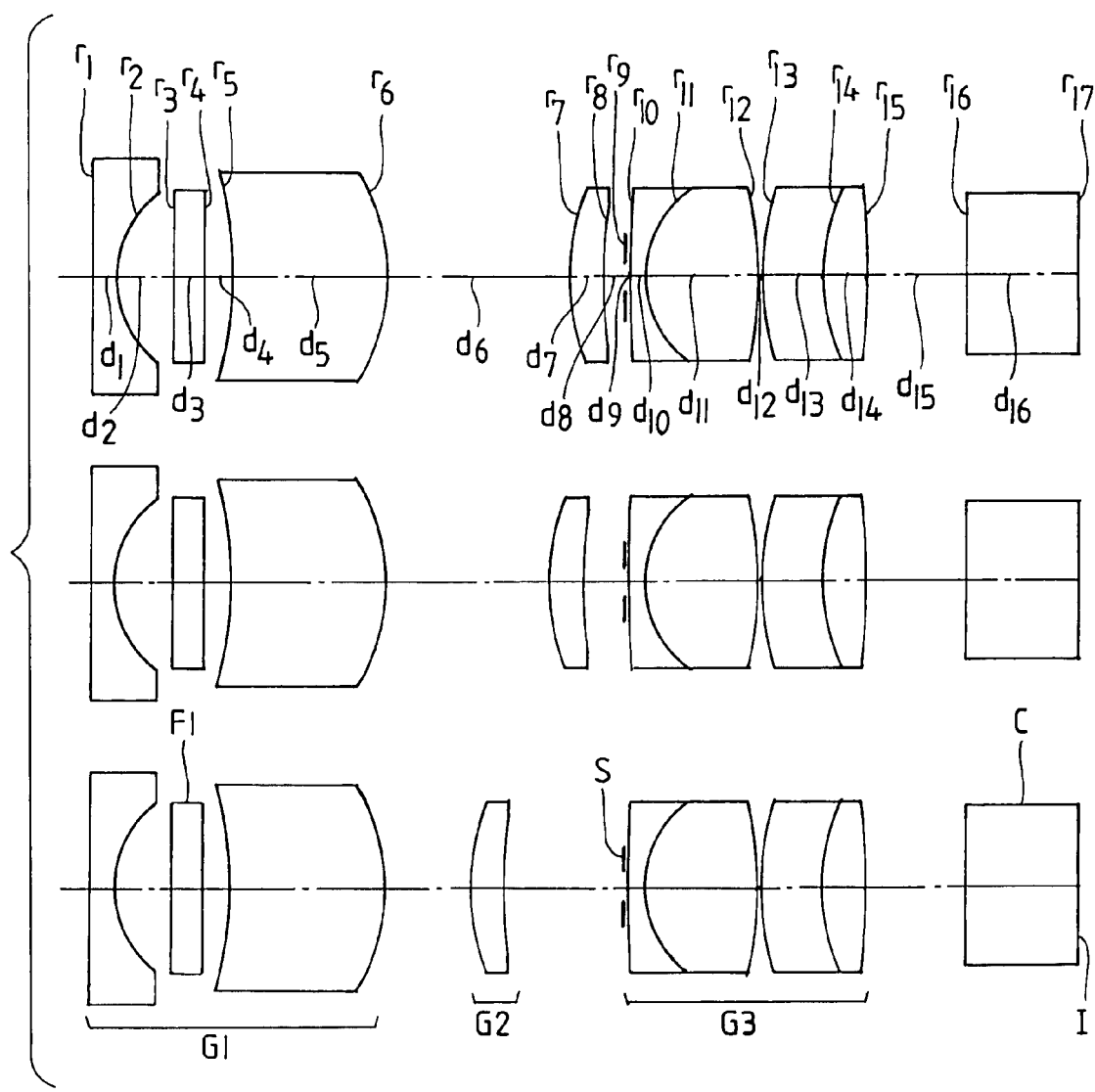
FIG. 3 is a sectional view illustrating a composition of a third embodiment of the present invention.

A third embodiment of the optical system according to the present invention has a composition illustrated in FIG. 3 and the following numerical data:

(object surface)

| | | | |
|---|---|---|---|
| | $d_0 = D0$ | | |
| $r_1 = \infty$ | $d_1 = 0.45$ | $n_1 = 1.88300$ | $v_1 = 40.78$ |
| $r_2 = 1.886$ | $d_2 = 1.00$ | | |
| $r_3 = \infty$ | $d_3 = 0.57$ | $n_2 = 1.52287$ | $v_2 = 59.89$ |
| $r_4 = \infty$ | $d_4 = 0.47$ | | |
| $r_5 = -6.999$ | $d_5 = 2.75$ | $n_3 = 1.69895$ | $v_3 = 30.13$ |
| $r_6 = -3.383$ | $d_6 = D1$ | | |
| $r_7 = 3.920$ | $d_7 = 0.61$ | $n_4 = 1.88300$ | $v_4 = 40.76$ |
| $r_8 = 9.496$ | $d_8 = D2$ | | |
| $r_9 = \infty$ (stop) | $d_9 = 0.09$ | | |
| $r_{10} = 33.957$ | $d_{10} = 0.27$ | $n_5 = 1.84666$ | $v_5 = 23.78$ |
| $r_{11} = 1.805$ | $d_{11} = 2.03$ | $n_6 = 1.51633$ | $v_6 = 64.14$ |
| $r_{12} = -6.057$ | $d_{12} = 0.08$ | | |
| $r_{13} = 5.501$ | $d_{13} = 1.09$ | $n_7 = 1.88300$ | $v_7 = 40.76$ |
| $r_{14} = 3.662$ | $d_{14} = 0.77$ | $n_8 = 1.80100$ | $v_8 = 34.97$ |
| $r_{15} = -15.338$ | $d_{15} = 1.82$ | | |
| $r_{16} = \infty$ | $d_{16} = 2.00$ | $n_9 = 1.51400$ | $v_9 = 75.00$ |
| $r_{17} = \infty$ | | | |

|  | Usual observing condition (wide position) | Intermediate condition | Condition for observing magnified image of object at short distance (tele position) |
|---|---|---|---|
| D0 | 23.50 | 10.50 | 3.00 |
| D1 | 3.26 | 2.92 | 1.53 |
| D2 | 0.39 | 0.72 | 2.12 |
| flw | 1.480 | 1.537 | 1.825 |
| Fno | 9.10 | 9.10 | 9.10 |

FW/FT = 1
$|f3/f2| = 0.81$
$|f2/f1| = 0.36$
FT = 9.1
$\beta T = -0.4$
$\omega = 60.7°$
f3/f1 = −0.29
hT/hW = 1.00
Enp/flw = 1.33
IH/(p × 1000) = 0.43

As illustrated in FIG. 3, the third embodiment consists, in order from the object side, of a first lens unit G1 having negative refractive power ($r_1$ to $r_6$), a second lens unit G2 having positive refractive power ($r_7$ to $r_8$) and a third lens unit G3 having positive refractive power ($r_{10}$ to $r_{15}$).

The third embodiment is configured to perform a magnification change and focusing from a usual observing condition (wide position) to a condition for observing a magnified image of an object at a short distance (tele position) by moving on the image side the second lens unit G2 along an optical axis, and an aperture stop S which is disposed on the object side of the third lens unit G3 is kept stationary during the magnification change.

Speaking concretely, the third embodiment is different from the first embodiment and the second embodiment in that the third embodiment consists of the three negative, positive and positive lens units, that the third embodiment performs the magnification change by moving the second positive lens unit and that the aperture stop which is disposed on the object side of the third lens unit is kept stationary during the magnification change.

In the third embodiment, the first negative lens unit G1 consists of a plano-concave lens element ($r_1$ to $r_2$), a plane parallel plate F1 ($r_3$ to $r_4$) and a positive meniscus lens element ($r_5$ to $r_6$), the second lens unit G2 consists of a single positive meniscus lens element ($r_7$ to $r_8$), and the third lens unit G3 consists of a cemented lens component ($r_{10}$ to $r_{12}$) consisting of a negative meniscus lens element ($r_{10}$ to $r_{11}$) and a biconvex lens element ($r_{11}$ to $r_{12}$), and a cemented lens component ($r_{13}$ to $r_{15}$) consisting of a negative meniscus lens element ($r_{13}$ to $r_{14}$) and a biconvex lens element ($r_{14}$ to $r_{15}$), and a cover glass plate C is bonded to an image pickup surface I of an image pickup device.

The aperture stop S ($r_9$) is fixedly disposed on the object side of the third lens unit G3. Furthermore, the plane parallel plate F1 is a filter for cutting off a ray having a specific wavelength, for example, a ray having a wavelength of 1060 nm from the YAG laser, a ray having a wavelength of 810 nm from a semiconductor laser or a ray in the near infrared region.

The third embodiment satisfies the conditions (1), (2), (4), (6), (8), (9), (11) and (2-1).

The third embodiment consists of the three negative, positive and positive lens units as described above and comprises the aperture stop S which is disposed fixedly between the second lens unit G2 and the third lens unit G3 at a location close to an image surface, thereby allowing an F number to be changed little regardless of the aperture stop S which is kept stationary during the magnification change and being capable of providing a sufficient an observation depth in each condition from the usual observing condition (wide position) to the condition for observing the magnified image of the object at the short distance.

Figure 11:
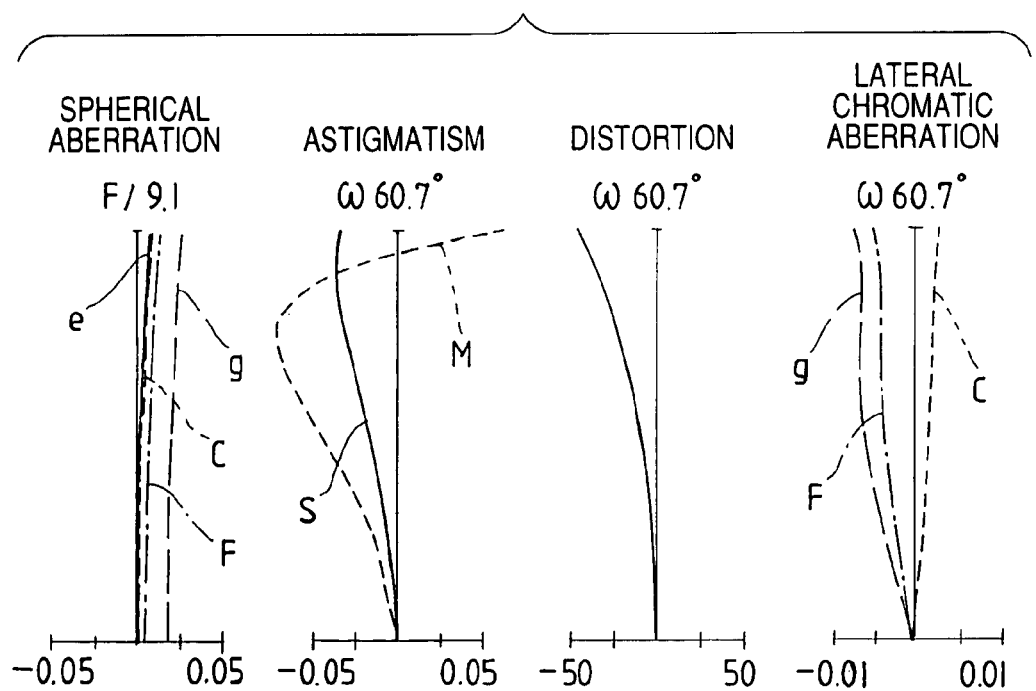
FIG. 11 shows curves illustrating aberrations in the third embodiment of the present invention set in a usual observing condition.
Figure 12:
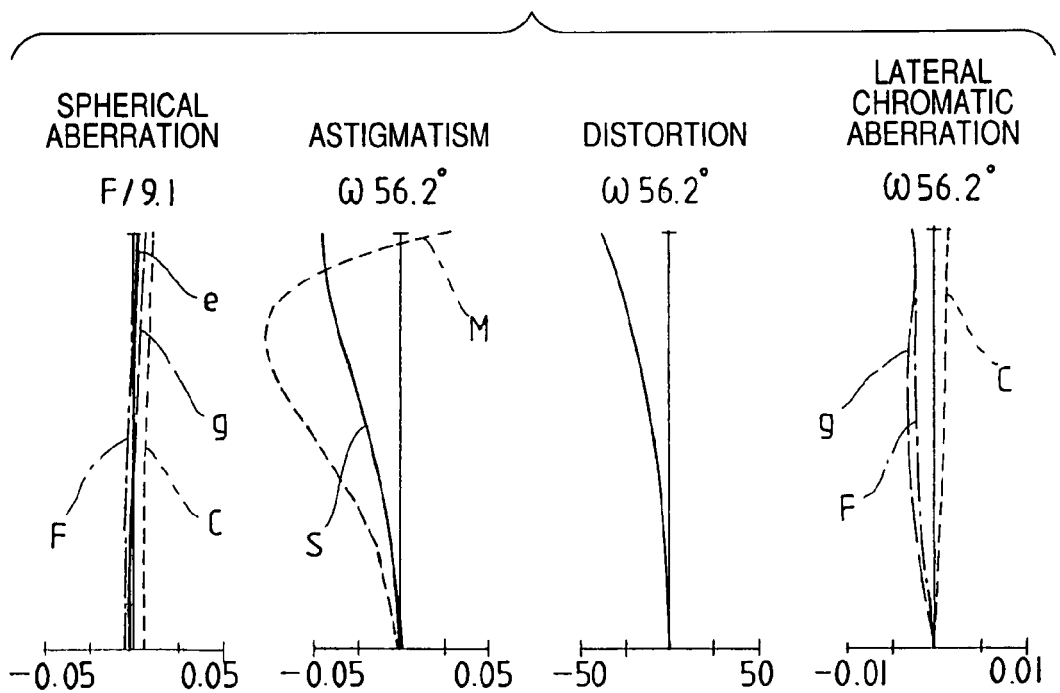
FIG. 12 shows curves illustrating aberrations in the third embodiment of the present invention set in an intermediate condition.
Figure 13:
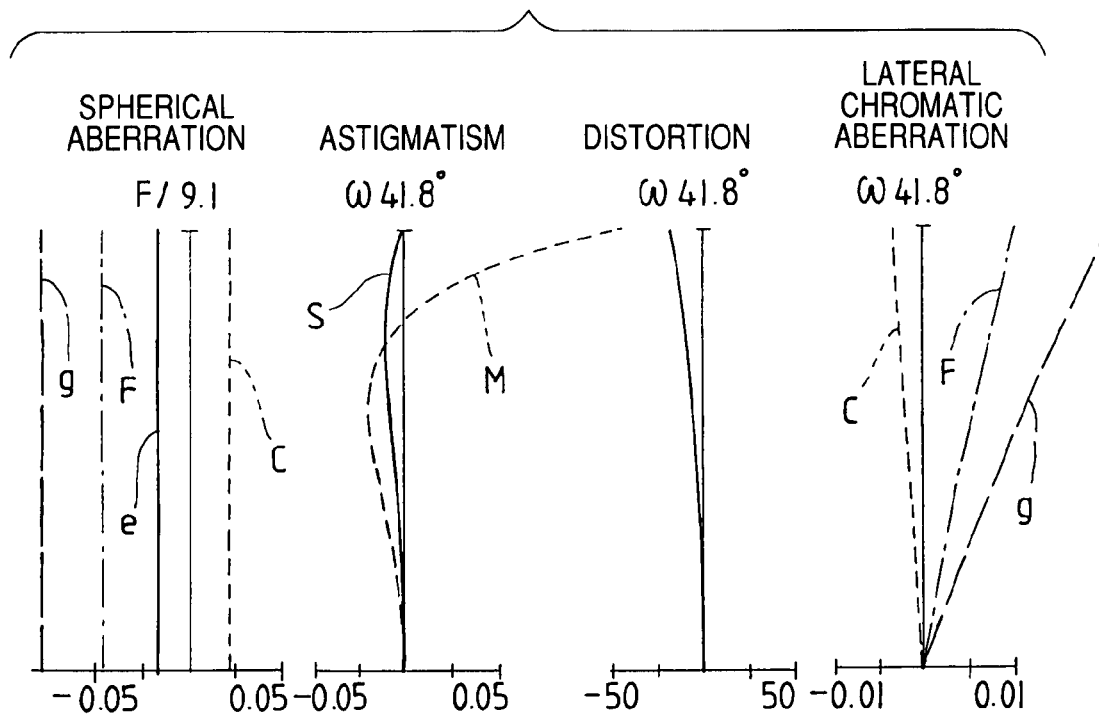
FIG. 13 shows curves illustrating aberrations in the third embodiment of the present invention set in a condition for observing a magnified image of an object at a short distance.

Aberrations in the third embodiment are illustrated in FIG. 11, FIG. 12 and FIG. 13. Out of these drawings, FIG. 11 shows aberration curves in the usual observing condition (at the wide position), FIG. 13 shows aberrations curves in an intermediate condition and FIG. 13 shows aberration curves in the condition for observing the magnified image of the object at the short distance (at the tele position): these curves visualizing little change of the F number, favorable correction of aberrations in each condition and little variations of aberrations.

The third embodiment is also capable of providing a highly precise image in each condition when the optical system is used in combination with an image pickup device which satisfies the condition (11) and on which picture elements are arranged in a large number.

Figure 4:
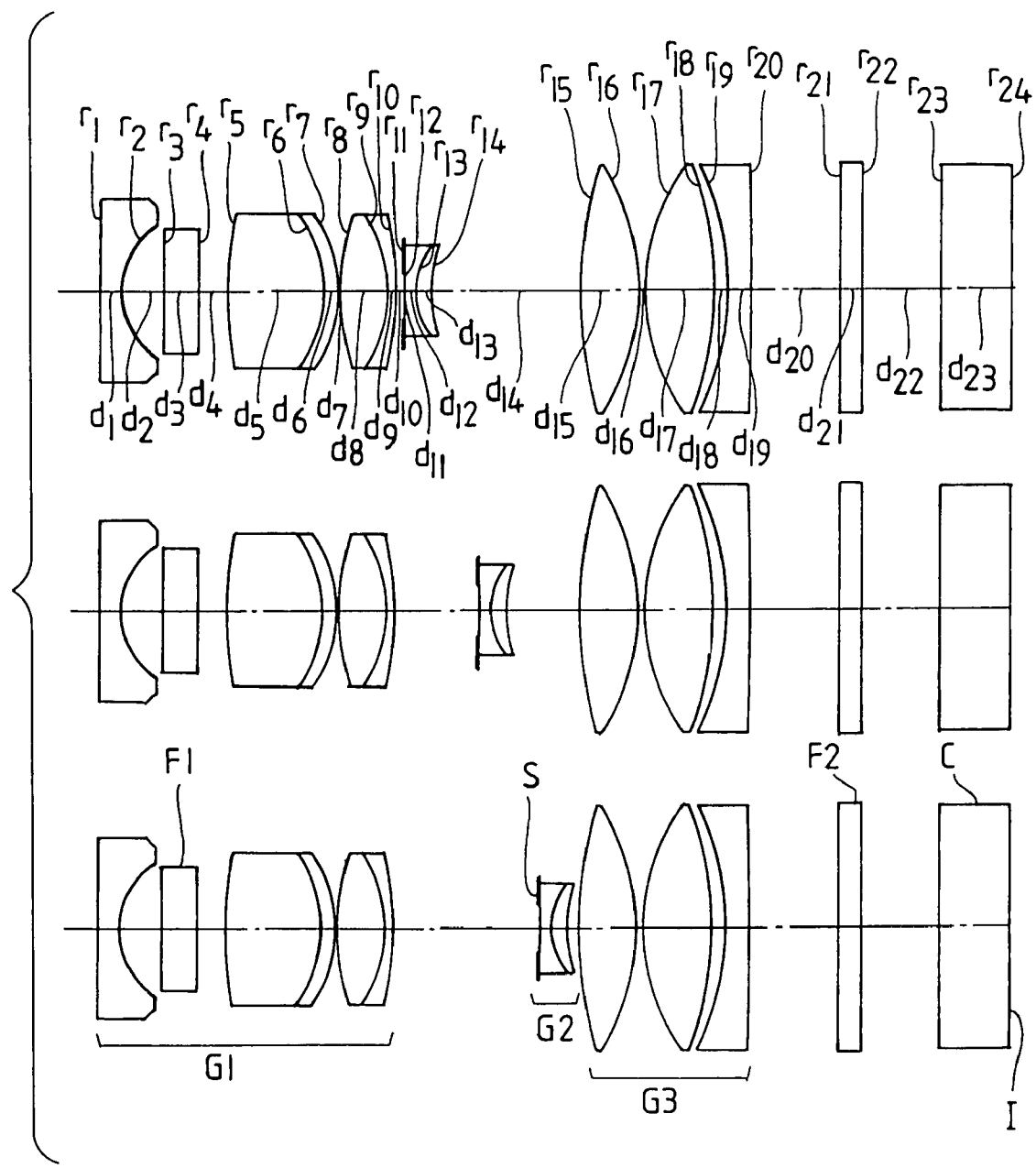
FIG. 4 is a sectional view illustrating a composition of a fourth embodiment of the present invention.

A fourth embodiment of the optical system according to the present invention has a composition illustrated in FIG. 4 and the following numerical data:

| (object surface) | | | |
|---|---|---|---|
| | $d_0$ = D0 | | |
| $r_1 = \infty$ | $d_1 = 0.36$ | $n_1 = 1.88300$ | $v_1 = 40.78$ |
| $r_2 = 1.318$ | $d_2 = 0.73$ | | |
| $r_3 = \infty$ | $d_3 = 0.62$ | $n_2 = 1.51400$ | $v_2 = 75.00$ |
| $r_4 = \infty$ | $d_4 = 0.47$ | | |
| $r_5 = 7.097$ | $d_5 = 1.69$ | $n_3 = 1.48749$ | $v_3 = 70.23$ |
| $r_6 = -1.911$ | $d_6 = 0.24$ | $n_4 = 1.84666$ | $v_4 = 23.78$ |
| $r_7 = -2.140$ | $d_7 = 0.02$ | | |
| $r_8 = 4.116$ | $d_8 = 0.82$ | $n_5 = 1.64000$ | $v_5 = 60.08$ |
| $r_9 = -2.181$ | $d_9 = 0.12$ | $n_6 = 2.00330$ | $v_6 = 28.27$ |
| $r_{10} = -5.343$ | $d_{10}$ = D1 | | |
| $r_{11} = \infty$ (stop) | $d_{11} = 0.02$ | | |
| $r_{12} = -5.181$ | $d_{12} = 0.19$ | $n_7 = 1.60300$ | $v_7 = 65.44$ |
| $r_{13} = 1.143$ | $d_{13} = 0.24$ | $n_8 = 1.68893$ | $v_8 = 31.07$ |
| $r_{14} = 2.182$ | $d_{14}$ = D2 | | |
| $r_{15} = 6.990$ | $d_{15} = 1.00$ | $n_9 = 1.48749$ | $v_9 = 70.23$ |
| $r_{16} = -3.748$ | $d_{16} = 0.12$ | | |
| $r_{17} = 3.540$ | $d_{17} = 1.16$ | $n_{10} = 1.49700$ | $v_{10} = 81.54$ |
| $r_{18} = -5.952$ | $d_{18} = 0.22$ | | |
| $r_{19} = -4.732$ | $d_{19} = 0.42$ | $n_{11} = 1.92286$ | $v_{11} = 18.90$ |
| $r_{20} = -90.467$ | $d_{20} = 1.55$ | | |
| $r_{21} = \infty$ | $d_{22} = 0.40$ | $n_{12} = 1.52287$ | $v_{12} = 59.89$ |
| $r_{22} = \infty$ | $d_{22} = 1.35$ | | |
| $r_{23} = \infty$ | $d_{23} = 1.20$ | $n_{13} = 1.51633$ | $v_{13} = 64.14$ |
| $r_{24} = \infty$ | | | |

|  | Usual observing condition (wide position) | Intermediate condition | Condition for observing magnified image of object at short distance (tele position) |
|---|---|---|---|
| D0 | 20.00 | 2.00 | 0.88 |
| D1 | 0.15 | 1.47 | 2.53 |
| D2 | 2.57 | 1.26 | 0.20 |
| flw | 1.787 | 2.336 | 2.157 |
| Fno | 5.87 | 6.87 | 7.66 |

FW/FT = 0.77
$|f3/f2| = 1.34$
$|f2/f1| = 1.59$
FT = 7.7

-continued

βT = −1.73
ω = 66.5°
f3/f1 = 2.13
hT/hW = 0.48
Enp/flw = 0.72
IH/(p × 1000) = 0.49

As illustrated in FIG. 4, the fourth embodiment consists, in order from the object side, of a first lens unit G1 having positive refractive power, a second lens unit G2 having negative refractive power and a third lens unit G3 having positive refractive power. The fourth embodiment performs a magnification change and focusing from a usual observing condition (wide position) to a condition for observing a magnified image of an object at a short distance (tele position) by moving the second lens unit G2 from the object side to the image side along an optical axis. Furthermore, an aperture stop S is disposed on the object side of the second lens unit G2 and moved together with the second lens unit G2 for the magnification change.

Speaking concretely, the second lens unit G2 is moved together with the aperture stop S as illustrated at an upper stage (the usual observing condition), a middle stage (an intermediate condition) and a lower stage (the condition for observing the magnified image of the object at the short distance) in FIG. 4.

In the fourth embodiment illustrated in FIG. 4, the first lens unit G1 consists of a plano-concave lens element ($r_1$ to $r_2$), a plane parallel plate F1 ($r_3$ to $r_4$), a cemented lens component ($r_5$ to $r_7$) consisting of a biconvex lens element ($r_5$ to $r_6$) and a meniscus lens element ($r_6$ to $r_7$), and a cemented lens component ($r_8$ to $r_{10}$) consisting of a biconvex lens element ($r_8$ to $r_9$) and a negative meniscus lens element ($r_9$ to $r_{10}$), the second lens unit G2 consists of a cemented lens component ($r_{12}$ to $r_{14}$) consisting of a biconcave lens element ($r_{12}$ to $r_{13}$) and a positive meniscus lens element ($r_{13}$ to $r_{14}$), and the third lens unit G3 consists of two biconvex lens elements ($r_{15}$ to $r_{16}$) and ($r_{17}$ to $r_{18}$), and a negative meniscus lens element ($r_{19}$ to $r_{20}$).

Furthermore, a cover glass plate C ($r_{23}$ to $r_{24}$) is bonded to an image pickup surface I of an image pickup device. Disposed between the third lens unit G3 and the cover glass plate C is a plane parallel plate F2 ($r_{21}$ to $r_{22}$).

The plane parallel plates F1 and F2 are filters for cutting off rays having specific wavelengths respectively, for example, a ray having a wavelength of 1060 nm from the YAG laser, a ray having a wavelength of 810 nm or rays in the near infrared region.

The aperture stop S ($r_{11}$) is disposed on the object side of the second lens unit G2 and moved together with the second lens unit G2 along the optical axis for the magnification change.

The optical system according to the fourth embodiment satisfies the conditions (2) to (7), the condition (9) and the condition (11).

The fourth embodiment is configured so as to satisfy the condition (5-1). The fourth embodiment therefore permits observing a tissue of a living body at a cell level in the condition for observing the magnified image of the object at the short distance (at the tele position) and reserves a wide visual field in the usual observing condition (at the wide position), thereby making it possible to performs works such as screening of an interior of a living body for finding a morbid portion, treatment of the morbid portion and the like.

When an optical system is configured so as to have an observation magnification satisfying the condition (5-1) in a condition for observing a magnified image of an object at a short distance like the fourth embodiment, it is difficult to configure the optical system so as to satisfy the condition (1). Therefore, the fourth embodiment does not satisfy the condition (1).

However, the fourth embodiment allows an F number to be changed so remarkably even when the optical system is combined with an image pickup device on which picture elements are arranged in a large number, thereby being capable of maintaining a hindrance-free observation depth since the fourth embodiment consists, in order from the object side, of the positive, negative and positive lens units, moves the second lens unit G2 together with the aperture stop S for changing a vari-focal condition from the usual observing condition (wide position) to the condition for observing the magnified image of the object at the short distance (tele position) and selects an appropriate power distribution among the lens unit.

Speaking concretely, the fourth embodiment is configured to maintain predetermined resolution on a side of an extremely short point in the observation depth by enlarging the F number to the vicinity of the diffraction limit in he condition for observing the magnified image of the object at the short distance (at the tele position) and sets an aperture diameter of the aperture stop at such a degree as to obtain desired resolution on a side of a far point in the observation depth though the F number is smaller in the usual observing condition (at the wide position).

Furthermore, the fourth embodiment provides a great merit to make it possible to realize an optical system which has a small F number and is therefore bright.

The optical system according to the fourth embodiment does not allow an image quality to be lowered and has a compact composition since focal lengths of the first lens unit G1, the second lens unit G2 and the third lens unit G3 have values which are set appropriately and satisfy the conditions (2), (3) and (7).

Figure 14:
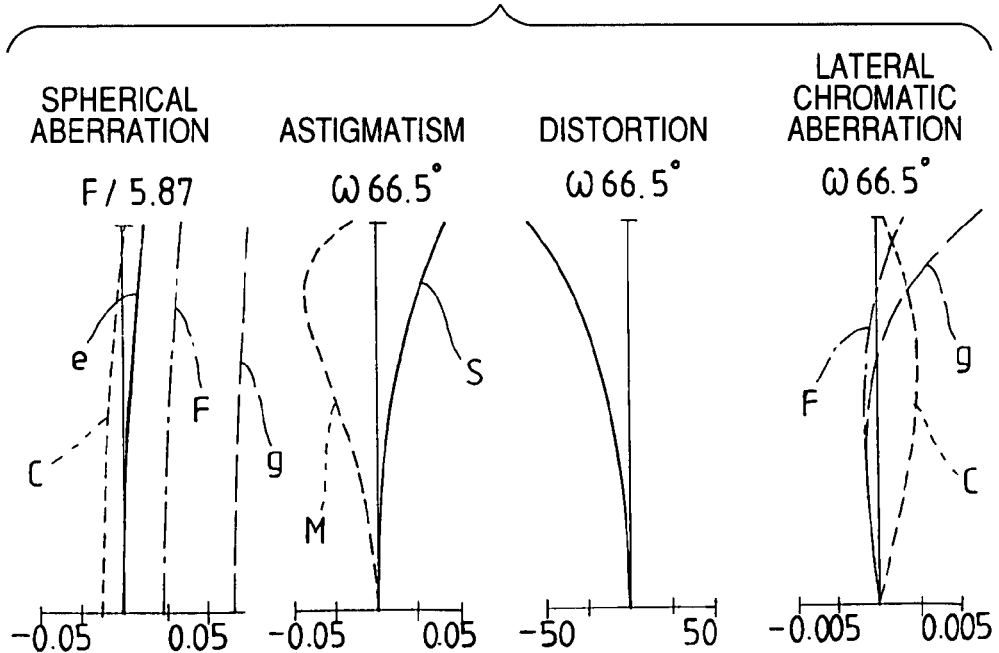
FIG. 14 shows curves illustrating aberrations in the fourth embodiment of the present invention set in a usual observing condition.
Figure 15:
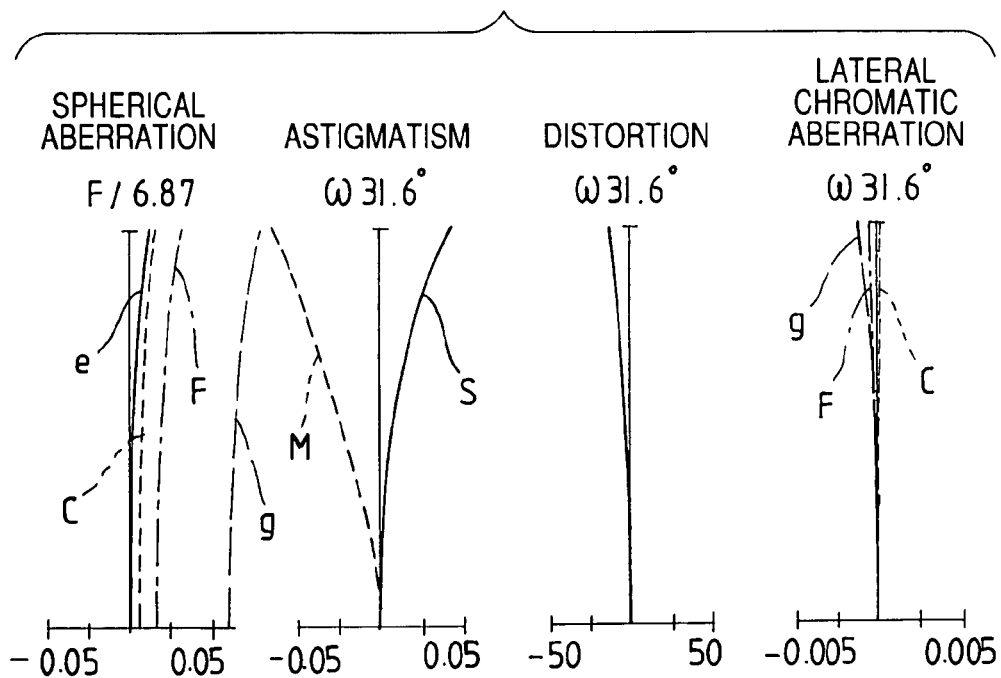
FIG. 15 shows curves illustrating aberrations in the fourth embodiment of the present invention set in an intermediate condition.
Figure 16:
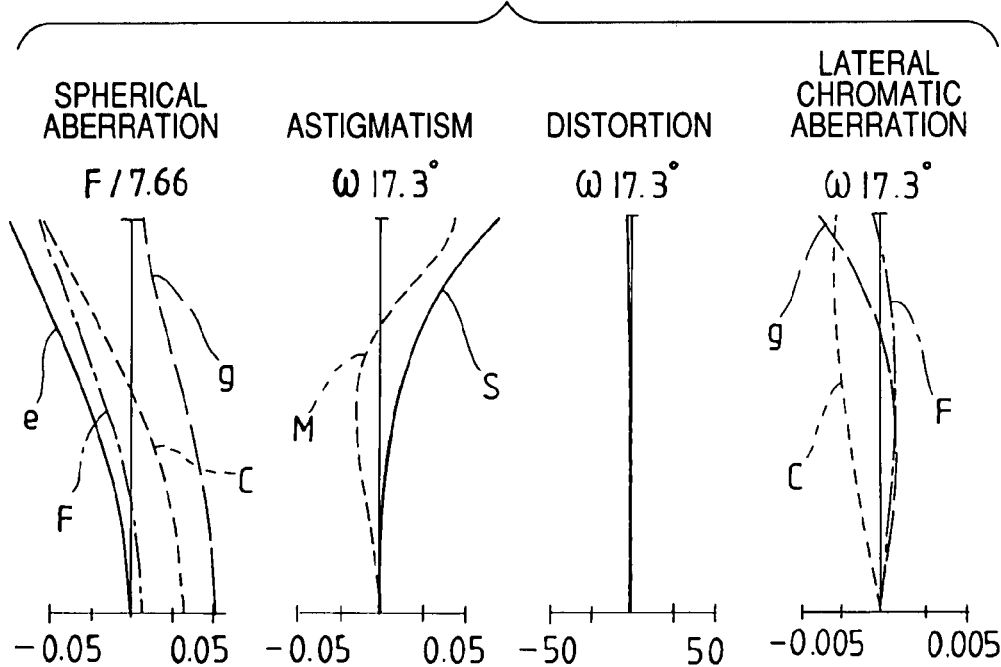
FIG. 16 shows curves illustrating aberrations in the fourth embodiment of the present invention set in a condition for observing a magnified image of an object at a short distance.

FIG. 14, FIG. 15 and FIG. 16 are curves illustrating aberrations in the fourth embodiment in the usual observing condition (at the wide position), an intermediate condition and the condition for observing the magnified image of the object at the short distance respectively.

As apparent from these drawings, the optical system according to the fourth embodiment allows the F number to be changed little, corrects aberrations favorably and varies aberrations little in each condition within an entire range from the usual observing condition (at the wide position) to the condition for observing the magnified image of the object at the short distance.

By use of the optical system according to the fourth embodiment in combination with an image pickup device which satisfies the condition (11) and on which picture elements are arranged in a large number it is possible to obtain a highly precise image in each vari-focal condition.

The invention claimed is:

1. A magnifying optical system for an endoscope comprising an objective lens system which includes lens units and can be set at least in a usual observing condition and in a condition for observing a magnified image of an object by moving any one of said lens units, wherein said objective lens system includes, in order from the object side, a first positive lens unit, an aperture stop, a second negative lens unit and a third positive lens unit, and performs focusing and a magnification change by moving the second negative lens unit together with the aperture stop along an optical axis, and satisfying the following condition (1):

$$F(W)/F(T) > 0.93 \qquad (1)$$

wherein reference symbols F(W) and F(T) represent F numbers of the optical system in the usual observing condition and in the condition for observing the magnified image of the object, respectively.

2. A magnifying optical system for an endoscope which comprises an objective lens system including, in order from the object side, a first positive lens unit, an aperture stop, a second negative lens unit and a third positive lens unit, performs focusing and a magnification change by moving said second negative lens unit together with the aperture stop along an optical axis, and satisfies the following condition (2):

$$0.4<|f3/f2|<1.38 \quad (2)$$

wherein reference symbols f2 and f3 represent focal lengths of the second lens unit and the third lens unit, respectively.

3. The magnifying optical system for an endoscope according to claim 2, satisfying the following condition (3):

$$1.5<|f2/f1|<3.5 \quad (3)$$

wherein reference symbols f1 and f2 represent focal lengths of the first lens unit and the second lens unit, respectively.

4. The magnifying optical system for an endoscope according to claim 2, satisfying the following condition (1):

$$F(W)/F(T)>0.93 \quad (1)$$

wherein reference symbols F(W) and F(T) represent F numbers of the optical system in a usual observing condition and in a condition for observing a magnified image of an object, respectively.

5. The magnifying optical system for an endoscope according to claim 1, satisfying the following condition (4):

$$F(T)<9.5. \quad (4)$$

6. The magnifying optical system for an endoscope according to claim 2, satisfying the following condition (5-1):

$$\beta(T)<-1.5 \quad (5-1)$$

wherein a reference symbol $\beta(T)$ represents a magnification of the optical system in a condition for observing a magnified image of an object.

7. The magnifying optical system for an endoscope according to claim 6, satisfying the following condition (6):

$$\omega>60° \quad (6)$$

wherein a reference symbol $\omega$ represents half a field angle of the optical system.

8. A magnifying optical system for an endoscope which consists of a plurality of lens units, performs focusing and a magnification change by moving only one lens unit of said lens units, and satisfies the following conditions (5-1) and (6):

$$\beta(T)<-1.5 \quad (5-1)$$

$$\omega<60° \quad (6)$$

wherein a reference symbol $\beta(T)$ represents a magnification of the optical system in a condition for observing a magnified image of an object and a reference symbol $\omega$ designates half a field angle of the optical system.

9. The magnifying optical system for an endoscope according to claim 8, which consists of a first positive lens unit, a second negative lens unit and a third positive lens unit, and performs focusing and a magnification change by moving the second negative lens unit along an optical axis.

10. The magnifying optical system for an endoscope according to claim 1, wherein a diameter of the aperture stop disposed in the optical system remains unchanged during focusing and the magnification change.

11. A magnifying optical system for an endoscope comprising an objective lens system which can be set at least in a usual observing condition and in a condition for observing a magnified image of an object and an image pickup device which is disposed so as to locate an image pickup surface in the vicinity of an imaging surface of the objective lens system and satisfying the following conditions (1) and (11):

$$F(W)/F(T)>0.93 \quad (1)$$

$$0.4<IH/(p\times1000)<0.7 \quad (11)$$

wherein reference symbols F(W) and F(T) represent F numbers of the optical system in the usual observing condition and in the condition for observing the magnified image of the object, respectively, a reference symbol IH represents a maximum image height on an image pickup surface of the image pickup device and a reference symbol p designates a pitch of the picture elements.

12. A magnifying optical system for an endoscope which comprises an objective lens system including, in order from the object side, a first positive lens unit, an aperture stop, a second negative lens unit and a third positive lens unit, and an image pickup device disposed so as to locate an image pickup surface in the vicinity of an imaging surface of said objective lens system, performs focusing and a magnification change by moving said second negative lens unit together with the aperture stop along an optical axis, and satisfies the following conditions (2) and (11):

$$0.4<|f3/f2|<1.38 \quad (2)$$

$$0.4<IH/(p\times1000)<0.7 \quad (11)$$

wherein reference symbols f2 and f3 represent focal lengths of the second and third lens units, respectively, a reference symbol IH represents a maximum image height on an image pickup surface of the image pickup device and a reference symbol p designates a pitch of the picture elements.

13. The magnifying optical system for an endoscope according to claim 12, satisfying the following condition (3):

$$1.5<|f2/f1|<3.5 \quad (3)$$

wherein a reference symbol f1 represents a focal length of the first lens unit.

14. The magnifying optical system for an endoscope according to claim 12, satisfying the following condition (1):

$$F(W)/F(T)>0.93 \quad (1)$$

wherein reference symbols F(W) and F(T) represent F numbers of the optical system in a usual observing condition and in a condition for observing a magnified image of an object, respectively.

15. The magnifying optical system for an endoscope according to claim 11, wherein said objective lens system includes, in order from the object side, a first positive lens unit, an aperture stop, a second negative lens unit and a third positive lens unit, and performs focusing and a magnification change by moving said second negative lens unit together with the aperture stop along an optical axis.

16. The magnifying optical system for an endoscope according to claim 11, satisfying the following condition (4):

$$F(T) < 9.5 \tag{4}$$

17. The magnifying optical system for an endoscope according to claim 12, satisfying the following condition (5-1):

$$\beta(T) < -1.5 \tag{5-1}$$

wherein a reference symbol $\beta(T)$ represents a magnification of the optical system in a condition for observing a magnified image of an object.

18. The magnifying optical system for an endoscope according to claim 17, satisfying the following condition (6):

$$\omega > 60° \tag{6}$$

wherein a reference symbol $\omega$ represents half a field angle of the optical system.

19. A magnifying optical system for an endoscope which comprises an objective lens system comprising a plurality of lens units and performing focusing and a magnification change by moving only one of the lens units, and an image pickup device disposed so as to locate an image pickup surface in the vicinity of an imaging surface of the objective lens system, and satisfies the following conditions (5-1), (6) and (11):

$$\beta(T) < -1.5 \tag{5-1}$$

$$\omega > 60° \tag{6}$$

$$0.4 < IH/(p \times 1000) < 0.7 \tag{11}$$

wherein a reference symbol $\beta(T)$ represents a magnification of the optical system in a condition for observing a magnified image of an object, a reference symbol $\omega$ designates half a field angle of the optical system, a reference symbol IH represents a maximum image height on an image pickup surface of the image pickup device and a reference symbol p designates a pitch of the picture elements.

20. The magnifying optical system for an endoscope according to claim 19, wherein said objective lens system includes, in order from the object side, a first positive lens unit, an aperture stop, a second negative lens unit and a third positive lens unit, and performs focusing and a magnification change by moving said second negative lens unit along an optical axis.

* * * * *

UNITED STATES PATENT AND TRADEMARK OFFICE
CERTIFICATE OF CORRECTION

PATENT NO. : 7,499,226 B2
APPLICATION NO. : 11/710662
DATED : March 3, 2009
INVENTOR(S) : H. Takato Page 1 of 1

It is certified that error appears in the above-identified patent and that said Letters Patent is hereby corrected as shown below:

Column 19, line 56, insert the following after formula (5-1):

-- $\omega > 60°$                              (6) --

Signed and Sealed this

Twenty-first Day of December, 2010

David J. Kappos
*Director of the United States Patent and Trademark Office*